Jan. 30, 1934.  A. NICOLATOS  1,945,289
AEROPLANE
Filed March 16, 1932  3 Sheets-Sheet 1
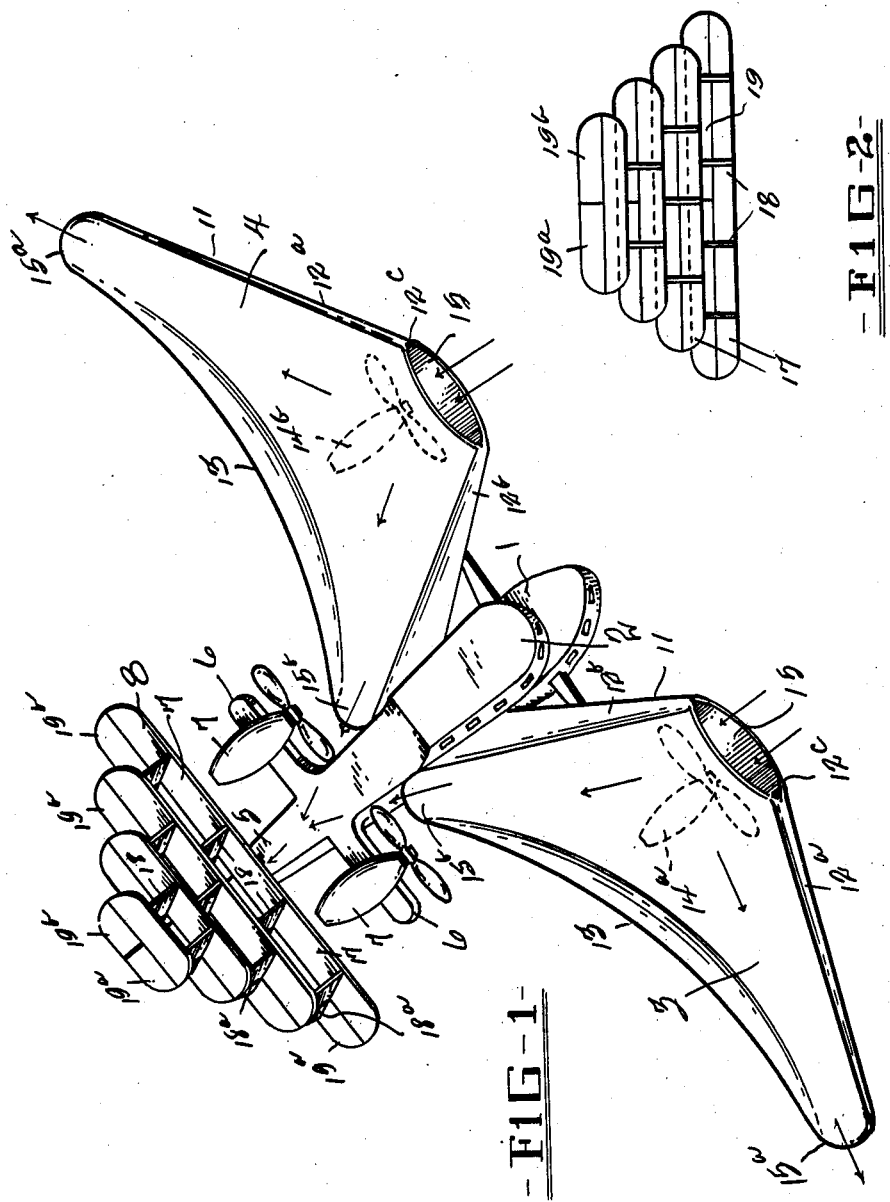
Inventor
ALEXANDROS NICOLATOS,
By
Attorney Jan. 30, 1934.  A. NICOLATOS  1,945,289
AEROPLANE
Filed March 16, 1932     3 Sheets-Sheet 2

Inventor
ALEXANDROS NICOLATOS
By
Attorney

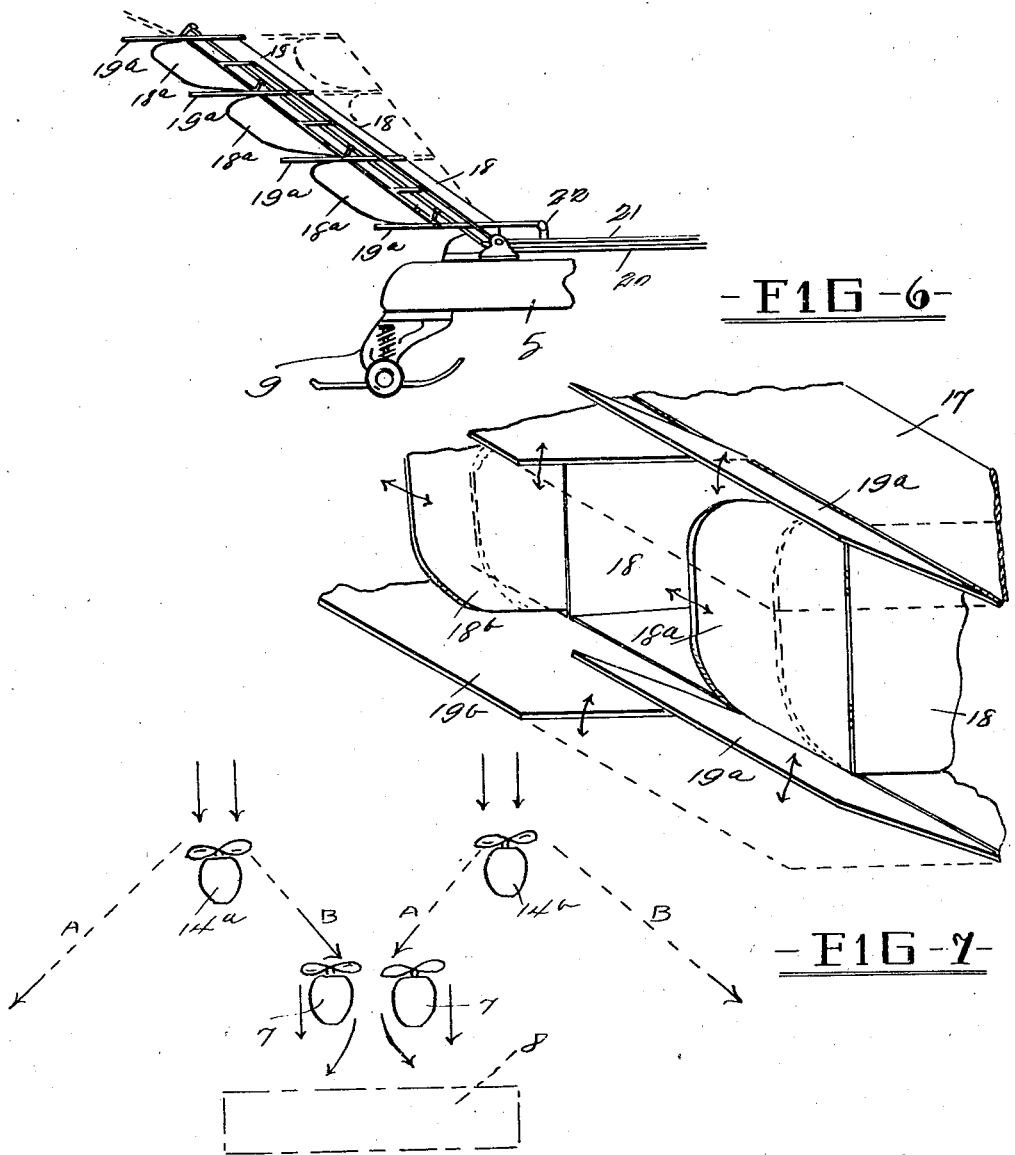

Patented Jan. 30, 1934

1,945,289

UNITED STATES PATENT OFFICE 1,945,289

AEROPLANE

Alexandros Nicolatos, New York, N. Y.

Application March 16, 1932. Serial No. 599,255

6 Claims. (Cl. 244—18)

My present invention, in its broad aspect, has reference to improvements in aeroplanes of the type wherein the principal propulsive power is cause by sucking air into and expelling air from the wings of the aeroplane, in addition to utilization of the lifting power of the wing surfaces and of the banks of elevators in the tail of the aeroplane. More particularly it is my purpose to provide an aeroplane which is inherently balanced, capable of great speed, and positive in control.

My present aeroplane contemplates what may be broadly termed a "bat wing" design of the wings; that is each wing has its leading edge swept back from an apex about midway the inner and outer ends of the wing; the trailing edge of each wing is curved forwardly, and the wings have considerable thickness and are hollow, so that there is sufficient space in each wing to house a motor and propeller to draw air into the wing from an intake opening located midway the ends of each wing at the apex, and expel the air thus taken in in two streams, one stream being at each end of each wing toward the tail of the plane, so that the aeroplane is sucked and propelled by the currents of air so formed. My invention also provides for a series of stepped-back or staggered elevators at the tail of the aeroplane, with vertical stabilizing fins and rudders in conjunction therewith, and horizontal fins serving as controls in lifting or landing the plane; the bank of blades is also movable as a unit, and suitable controls are provided for operating the same.

My aeroplane is essentially stable, since by expelling the air at the respective two ends of each wing, the tendency of a wing to dip or rise is prevented, and a rocket-like action obtained; furthermore I provide near the tail of my aeroplane, and in advance of the bank of elevators, a pair (or more) motors, one adjacent each of the air outlets adjacent the fuselage; one half of the blade of each motor is in the slip stream of the outlet and the other in the solid air. My aeroplane is especially designed as a large passenger and freight carrier, or bombing plane; that is, the construction is especially adaptable to aeroplanes of great size, and in this connection it is to be noted that the fuselage is unincumbered by machinery, and that the propellers and motors are concealed in the wings, so that the slip streams of the propellers is not toward the cabins.

Since certain details of construction may be changed in practice without departing from the spirit of my invention, the right to make such changes is reserved provided they fall within the scope of what is claimed.

In the drawings wherein is illustrated the preferred form of my invention:—

Figure 1 is a perspective view of my aeroplane,

Figure 2 is a top plan view of my bank of elevators and control rudders,

Figure 3:
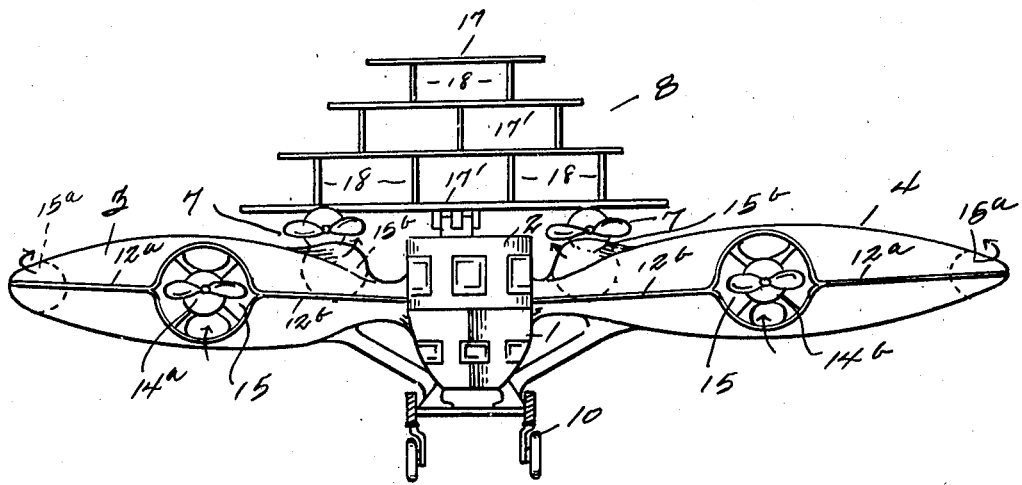
Figure 3 is a front view of my aeroplane.
Figure 4:
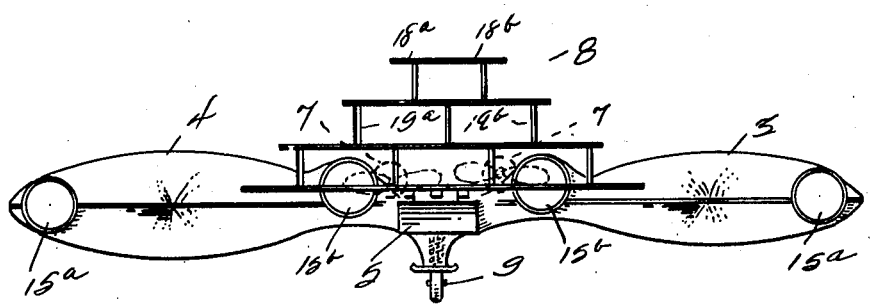
Figure 4 is a view looking toward the rear of my aeroplane.
Figure 5:
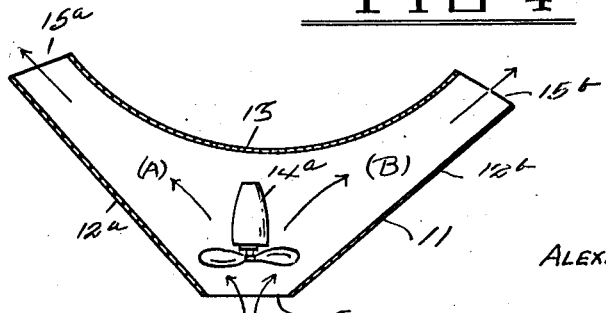

Figure 5 is a section through one wing and shows the position of the motor and propeller and the direction of the air currents, Figure 6 is a side view of my bank of elevators and control rudders, Figure 7 is a perspective view, partly fragmentary showing the method of controlling the movements of my aeroplane through the rudders and elevators, and Figure 8 is a diagrammatic view of the direction of flow of the air currents from the propellers.

In the drawings wherein is illustrated the preferred form of my invention, like characters of reference are used to designate like or similar parts throughout the several views, in which:—

The numeral (1) designates the fuselage of my aeroplane, and (2) the cabin. The wings (3) and (4) are joined to the fuselage about midway between the nose and the tail (5), but somewhat closer to the nose, and back of the wings are lateral platforms (6) carrying motors (7); the bank of controls, rudders and elevators (8) is at the tail of the fuselage, which is equipped with the usual tail skid (9). There are the usual landing wheels, or gear (10) under the forward end of the fuselage.

Each wing of my aeroplane suggests a triangular figure; that is the leading or entering edge (11) is swept back as at (12a) and (12b) from an apex (12c) midway the ends of the wing, and in advance of the fuselage; the rear or trailing edge is curved forwardly as at (13); the edges of the wing are sharp, and the peculiar swept-back shape lends to the attainment of greater speed and stability. The two wings, as attached to the fuselage, resemble in general shape, position and construction a "bat wing" type, and each wing is relatively thick and hollow and the surface is shaped to give lift to the plane.

As stated each wing is hollow, and of sufficient thickness to accommodate a motor and propeller assembly, one for each wing, and designated (14a) and (14b). Each wing has an air inlet opening (15) at the apex (12c) and an air outlet (15a) and (15b) at the respective inner and outer ends of the wing at the trailing edge. The motor is located back of the air inlet (15) so that the air stream is split into two currents (A) and (B) see Figures 5 and 8, which pass out the respective outlets (15a) and (15b); the plane is therefore sucked and propelled along after the manner shown, and the peculiar shape and formation of the wings and the direction of the air currents renders it inherently stable; thus resisting wobbling, or dipping of the wings in flight. A motor (7) is located adjacent each air outlet (15a) and (15b) on the platform (6); they are so located that one half of the propeller is in the slip stream from the outlet and one half in the solid air; these are tractor type motors and further propel the aeroplane.

Back of the motors, on the tail of the fuselage is a bank of rudders, elevators, stabilizers and controls generally designated by (8), and illustrated in detail in Figures 2, 6 and 7. The entire bank is hinged as at (16) to the tail of the fuselage for movement as a unit. It comprises a plurality of horizontal blades (17) preferably four in number, their length decreasing from the bottom blade to the top, and a plurality of similarly spaced vertical blades between and attached to the respective horizontal blades, same being designated (18). Each horizontal blade is divided centrally and lengthwise to provide horizontal rudders (19), and each vertical blade is likewise divided to provide vertical rudders (18a) and (18b). Furthermore the horizontal rudders are in independent sections (19a) and (19b) which are independently operable through controls (20) so that the necessary lift may be increased or decreased independently on each side of the aeroplane. The controls for the vertical rudders operate to control the rudders on each side as units; these controls are designated (21), and all controls are conventionally shown, and the lever and rod action necessary to obtain same are subject to wide choice. The entire bank may be tipped forwardly and backwardly by controls (22). The respective horizontal blades are stepped back as shown in Figure 2 to lend stability to the aeroplane, and the air currents from the motors and outlets are directed toward the bank of controls, i. e. rudders and elevators as shown by the arrows in Figure 1.

In operation, the motors are started and the air is sucked into the wings and discharged rearwardly with great force; and this is assisted by the rear motors. The horizontal blades and vertical blades are then set to direct the aeroplane upwardly, in which direction it will rise with great speed and stability.

Especial attention is directed to the formation of the wings; the positions of the motors; the paths of movement of the air currents, and the construction of the elevator and rudder bank. These are the essential features of my invention.

While it is believed that the operation and construction of my aeroplane will be clearly apparent from the foregoing; attention is again directed to the split air stream principle coupled with hollow bat-type wings in which the propellers are carried, and while certain details may be slightly changed in practice the right to make such changes is again emphasized provided they fall within the scope of what is claimed.

I claim:—

1. An aeroplane, comprising wings, a fuselage and control fins, said wings each having an air passage formed therein with a single inlet opening in the leading edge, and a pair of outlet openings one at each end of the wing; the volume of air admitted through the inlet opening being divided and exhausted respectively through the two outlet openings, a propeller assembly in each wing for sucking air into the wing and discharging the air from the wing, and said wings having a swept back conformation from an apical point at the inlet opening.

2. An aeroplane, comprising wings, each having a swept back conformation from an apical point located midway the ends of the wing, the leading edge of the wing being directed rearwardly at an angle from the apical point to the fuselage, and from the apical point to the outer tip of the wing, the trailing edge of the wing being concave; said wing being hollow and having an air inlet opening in the leading edge at the apical point, and a pair of air outlets directed toward the rear and arranged in the trailing edge and the respective ends of the wing, and a propeller assembly in the wing and designed to draw air into the wing through the air inlet opening and discharge said air through the two outlet openings.

3. An aeroplane, comprising wings, a fuselage and control means, said wings being set midway the ends of the fuselage, and each having a swept back conformation from an apical point located midway the ends of the wing in the leading edge, the leading edge of the wing being directed rearwardly at an angle from the apical point to the fuselage, and from the apical point to the outer tip of the wing; the trailing edge of the wing being concave; each wing being hollow, and each having a single air inlet opening at the apical point in the leading edge, and a pair of air outlet openings in the trailing edge, one located at each end of the wing, and a propeller assembly in the wing for sucking air through the intake opening and discharging said air through the outlet openings, and other propeller assemblies carried by the fuselage back of the wings and in advance of the control fins.

4. An aeroplane, comprising wings, a fuselage and control means, said wings being set substantially midway the ends of the fuselage, and each having a swept back conformation from an apical point located substantially midway the ends of the wing in the leading edge, the leading edge of each wing being directed rearwardly at an angle from the apical point to the fuselage, and from the apical point to the outer tip of the wing; the trailing edge of the wing being curved inwardly toward the apical point in the leading edge; each wing being hollow, and each having a single air inlet opening in the apical point, and a pair of air outlet openings in the trailing edge at the respective ends of the wing, a propeller assembly in each wing for sucking air into the wing through the inlet opening and discharging it through the two outlet openings, other propeller assemblies, located one adjacent each of the outlet openings at the inner ends of the wings, and having a part of the propeller blade expanse located in the air slip stream from said outlet opening.

5. A wing structure for aeroplanes; each wing having an unobstructed hollow interior substantially coextensive with the body of the wing, said wing having a swept back conformation from an apical point in the leading edge; the trailing edge of the wing being inwardly curved, and said interior hollow part having openings to the air through the leading edge and trailing edge.

6. A wing structure for aeroplanes; each wing having a hollow interior cavity substantially coextensive with the body of the wing; said wing having a swept back conformation from an apical point located substantially midway the length of the leading edge of the wing; the trailing edge being curved forwardly, and the wing having openings at its inner and outer ends directed rearwardly and another opening at the apex of the leading edge, all of which communicate with the interior cavity; the overall thickness of the wing decreasing from a point near the leading edge to the trailing edge.

ALEXANDROS NICOLATOS.